(12) United States Patent
Xue

(10) Patent No.: US 12,727,578 B2
(45) Date of Patent: Sep. 8, 2026

(54) PET FEEDER

(71) Applicant: Dongguan ZhiYiHong Hardware & Plastic Co., Ltd., Dongguan (CN)

(72) Inventor: Zhiqi Xue, Dongguan (CN)

(73) Assignee: Dongguan ZhiYiHong Hardware & Plastic Co., Ltd., Dongguan (CN)

( * ) Notice: Subject to any disclaimer, the term of this patent is extended or adjusted under 35 U.S.C. 154(b) by 0 days.

(21) Appl. No.: 19/206,191

(22) Filed: May 13, 2025

(65) Prior Publication Data

US 2025/0380664 A1 Dec. 18, 2025

(30) Foreign Application Priority Data

Jun. 12, 2024 (CN) ......................... 202421328033.4

(51) Int. Cl.
*A01K 5/02* (2006.01)

(52) U.S. Cl.
CPC .................................. *A01K 5/0275* (2013.01)

(58) Field of Classification Search
CPC .. A01K 5/0114; A01K 5/0121; A01K 5/0142; A01K 5/0233; A01K 5/0275
See application file for complete search history.

(56) References Cited

U.S. PATENT DOCUMENTS 10,398,127 B2 * 9/2019 Hu .......................... A61B 5/01
11,666,158 B1 * 6/2023 Margetis ............. A01K 5/0291 222/77
2009/0064938 A1 * 3/2009 Or ........................ A01K 5/0291 119/51.5
2010/0263596 A1 * 10/2010 Schumann ........... A01K 5/0114 119/51.02
2022/0039351 A1 * 2/2022 Kim ..................... A01K 5/0291
2023/0180714 A1 * 6/2023 Wu ...................... A01K 5/0142 119/57
2023/0225287 A1 * 7/2023 Yu ........................ A01K 5/0275 119/51.01
2023/0240257 A1 * 8/2023 Zhang .................. A01K 5/0114 119/61.5
2023/0309508 A1 * 10/2023 Beck .................... A01K 5/0114 119/51.02
2024/0188535 A1 * 6/2024 Doughty .............. A01K 1/0158
(Continued)

FOREIGN PATENT DOCUMENTS

CN 114931102 A * 8/2022 ............... A01K 5/02
CN 116369228 A * 7/2023 ........... A01K 5/0275
(Continued)

*Primary Examiner* — Monica L Perry
*Assistant Examiner* — Aaron M Rodziwicz
(74) *Attorney, Agent, or Firm* — Ricky Lam

(57) ABSTRACT

A pet feeder includes: a food container assembly, feeding assemblies and a base, in which, the food container assembly and the feeding assemblies are connected to the base. The food container assembly is used for storing food, and the feeding assemblies are used for conveying the food stored in the food container assembly to a pet eating position; the food container assembly includes at least two food distribution bins which are not in communication with each other; and the feeding assemblies correspond to the food distribution bins in quantity and are matched with the food distribution bins one by one, so that any food distribution bin independently conveys the food by means of the corresponding feeding assembly.

18 Claims, 5 Drawing Sheets

(56) References Cited

U.S. PATENT DOCUMENTS

| | | | | |
|---|---|---|---|---|
| 2024/0268341 | A1* | 8/2024 | Sides | A01K 5/0225 |
| 2024/0306601 | A1 | 9/2024 | Wu | |
| 2024/0315197 | A1* | 9/2024 | Vachula | A01K 5/0114 |
| 2025/0120364 | A1* | 4/2025 | Tompkins | A01K 5/0135 |
| 2025/0187893 | A1* | 6/2025 | Cowan | A01K 5/0114 |
| 2026/0041058 | A1* | 2/2026 | Franklin | A01K 5/0128 |

FOREIGN PATENT DOCUMENTS

| | | | | |
|---|---|---|---|---|
| CN | 219894211 | U | * 10/2023 | |
| CN | 117016413 | A | * 11/2023 | A01K 5/004 |
| CN | 118077598 | A | * 5/2024 | A01K 5/02 |
| CN | 119138346 | A | * 12/2024 | A01K 5/0114 |
| DE | 202024106154 | U1 | * 11/2024 | A01K 5/0225 |
| KR | 20160058547 | A | * 5/2016 | A01K 5/02 |
| WO | WO-2020138742 | A1 | * 7/2020 | A01K 5/02 |
| WO | WO-2025106809 | A2 | * 5/2025 | A01K 5/0114 |
| WO | WO-2025106946 | A1 | * 5/2025 | A01K 5/0291 |

* cited by examiner

PET FEEDER

FIELD OF THE INVENTION

The present application relates to the technical field of pet supplies, and particularly relates to a pet feeder.

BACKGROUND OF THE INVENTION

Pet feeders provided by related technology mostly are provided with a single food bin, a single food outlet and a single food basin, so they can only store and feed a single kind of food, which cannot meet the demand of feeding a plurality of pets at the same time or providing various foods in one meal.

Even if some pet feeders have been provided with a plurality of food basins to achieve the effect of feeding a plurality of pets with one pet feeder, the demand of providing various foods in one meal cannot be met.

SUMMARY OF THE INVENTION

The present application provides a pet feeder to solve the problem that an existing pet feeder cannot produce various foods in one meal.

In order to achieve the above object, the present invention provides the following technical solutions:

a pet feeder, comprising a food container assembly, feeding assemblies and a base, in which the food container assembly and the feeding assemblies are connected to the base; the food container assembly is used for storing food, and the feeding assemblies are used for conveying the food stored in the food container assembly to a pet eating position; and the food container assembly comprises at least two food distribution bins which are not in communication with each other, and the feeding assemblies correspond to the food distribution bins in quantity and are matched with the food distribution bins one by one, so that any food distribution bin can independently convey food by means of the corresponding feeding assembly.

Further, any feeding assembly comprises a food conveying mechanism and a food channel, and the food conveying mechanism is movably arranged in the food channel;

when closing a feeding mode of the pet feeder, the food conveying mechanism is at an initial position, and the food channel is in communication with the corresponding food distribution bin; when starting the feeding mode of the pet feeder, the food conveying mechanism moves and leaves the initial position to convey the food to the pet eating position from the food channel; after the feeding mode is ended, and the food conveying mechanism returns to the initial position.

Further, any two food channels are not in communication with each other.

Further, the food channels comprise movable portions through which the food conveying mechanisms can move and feeding portions connected to the ends, far away from the initial position, of the movable portions; the foods in the food distribution bins enter the movable portions under the movement of the food conveying mechanisms, and are conveyed to the pet eating position by means of the feeding portions under the movement of the food conveying mechanisms.

Further, the pet feeder further comprises: a control assembly used for controlling the food conveying amount each time in the feeding mode, wherein the control assembly comprises a plurality of sensing members arranged on the food conveying mechanisms and detection members arranged in the food channels; and the control assembly controls the food conveying amount by adjusting the moving positions of the food conveying mechanisms.

Further, the plurality of sensing members are linearly arranged on the top of the food conveying mechanisms.

Further, the pet feeder is further provided with food baffles for controlling the food conveying amount each time in the feeding mode, and the food baffles are movably arranged in the food channels.

Further, the food baffles are rotationally connected to the food channels, and are used for opening or closing the food channels when the food conveying mechanisms move to a certain position.

Further, the food baffles are connected to the inner peripheral walls of the food channels by torsional springs.

Further, the food conveying mechanisms are arranged to reciprocate in the food channels.

Further, the food conveying mechanisms comprise reduction gear boxes, driving gears connected to the reduction gear boxes in a meshed mode, and racks connected to the driving gears in a meshed mode; and the reciprocating direction of the food conveying mechanisms is consistent with the length direction of the racks.

Further, the food conveying mechanisms comprise food conveying push blocks used for pushing food, and second racks arranged in the food channels;

the food conveying push blocks comprise motors and reduction gear sets; the motors are provided with worms, and the reduction gear sets are connected to the worms in a meshed mode so that the motors can drive the reduction gear sets by means of the worms; the bottoms of the food conveying push blocks are connected to second driving gears, and the second driving gears are connected to the reduction gear sets by linkage structures so that the second driving gears and the reduction gear sets can move synchronously;

the second driving gears are connected to the second racks arranged in the food channels in a meshed mode; and when the motors drive the second driving gears to move, the food conveying push blocks move forwards or backwards in the food channels along the second racks.

Further, the feeding assemblies further comprise food basins which are arranged at the tail ends, far away from the movable portions, of the feeding portions.

Further, the food storage container assembly is arranged on the tops of the feeding assemblies.

Further, at least two food distribution bins which are not in communication with each other are linearly arranged.

Further, the food container assembly comprises at least three food distribution bins which are not in communication with one another, and the at least three food distribution bins which are not in communication with one another are annularly arranged.

Further, control device and a battery are arranged in the base, and the control device is electrically connected to the battery and the feeding assemblies.

Further, the control device comprises a communication module which is in communication connection with a mobile terminal so that a user can control the pet feeder by means of the mobile terminal.

Further, the control device further comprises a control panel arranged on the outer wall of the base.

According to the above technical solution, the following technical effects are achieved: the pet feeder provided by the present application is provided with at least two food distribution bins which are not in communication with each other, is also provided with feeding assemblies matched with the food distribution bins one to one, and each food distribution bin can independently convey food by means of the corresponding feeding assembly; therefore, the problem that a pet feeder in related technology is provided with only one food bin, which leads to single food feeding, or a food channel is shared, which leads to food pollution, can be avoided; and the pet feeder in the present application can not only meet the needs of feeding a plurality of pets at the same time, but also meet the needs of providing various foods in one meal; and moreover, the needs of feeding various pets that eat different foods by one pet feeder can also be met.

DETAILED DESCRIPTION OF SOME EMBODIMENTS

In order to better understand the technical solution of the present application, the embodiments provided in the present application are described in detail below in conjunction with the accompanying drawings.

Figure 1:
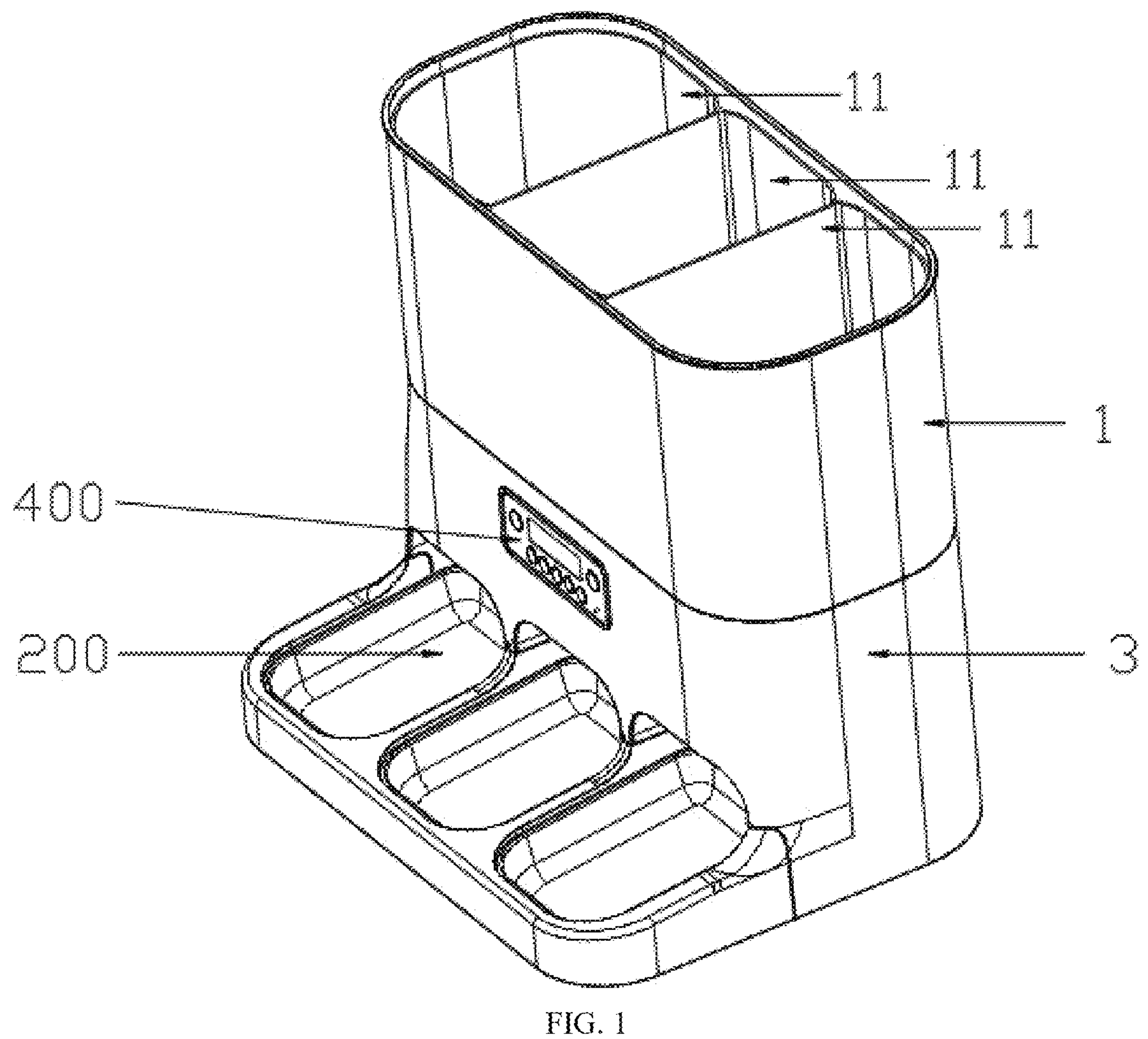
FIG. 1 is a schematic structural diagram (stereogram) of a pet feeder provided by the present application.
Figure 2:
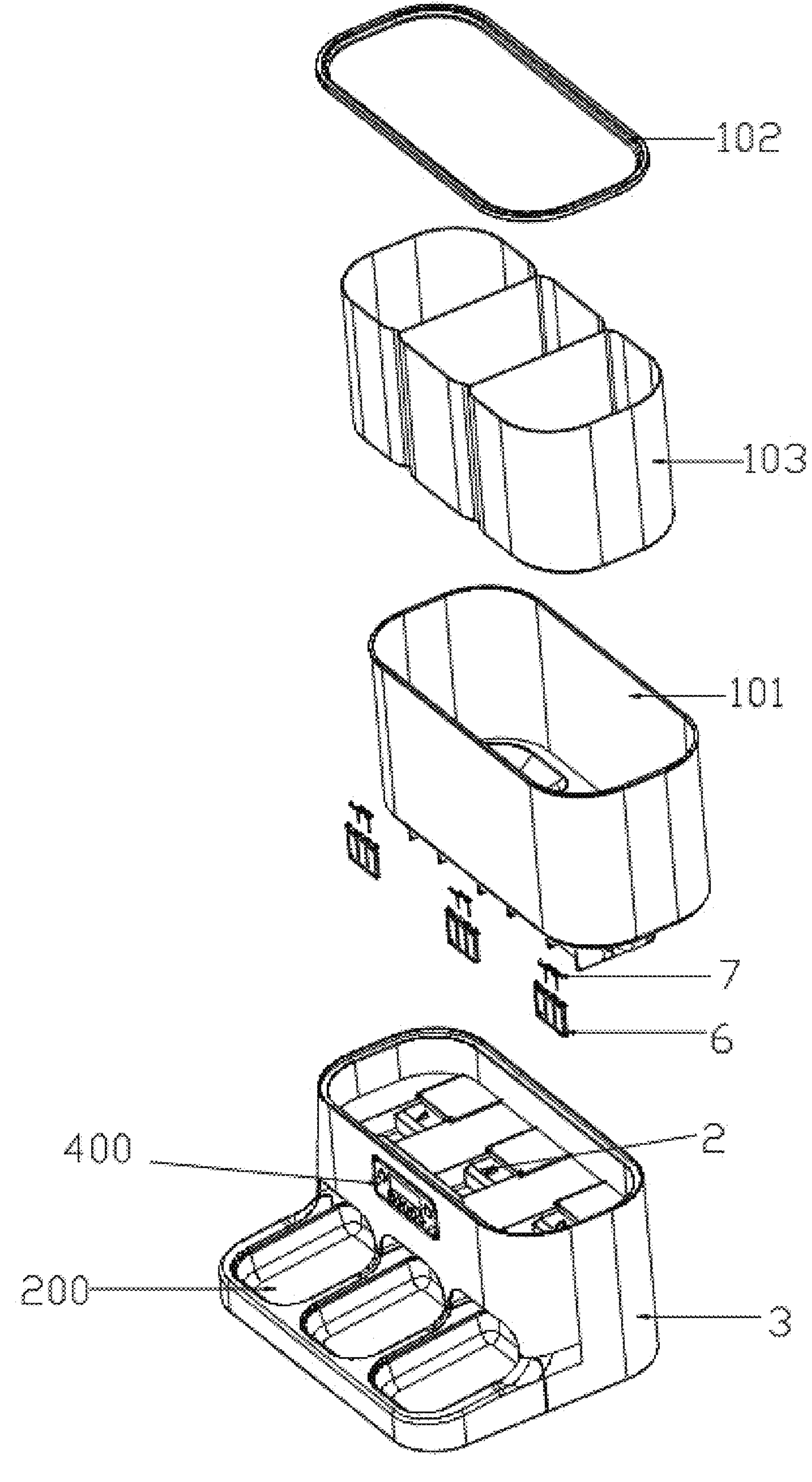
FIG. 2 is an exploded diagram of a pet feeder provided by the present application.
Figure 3:
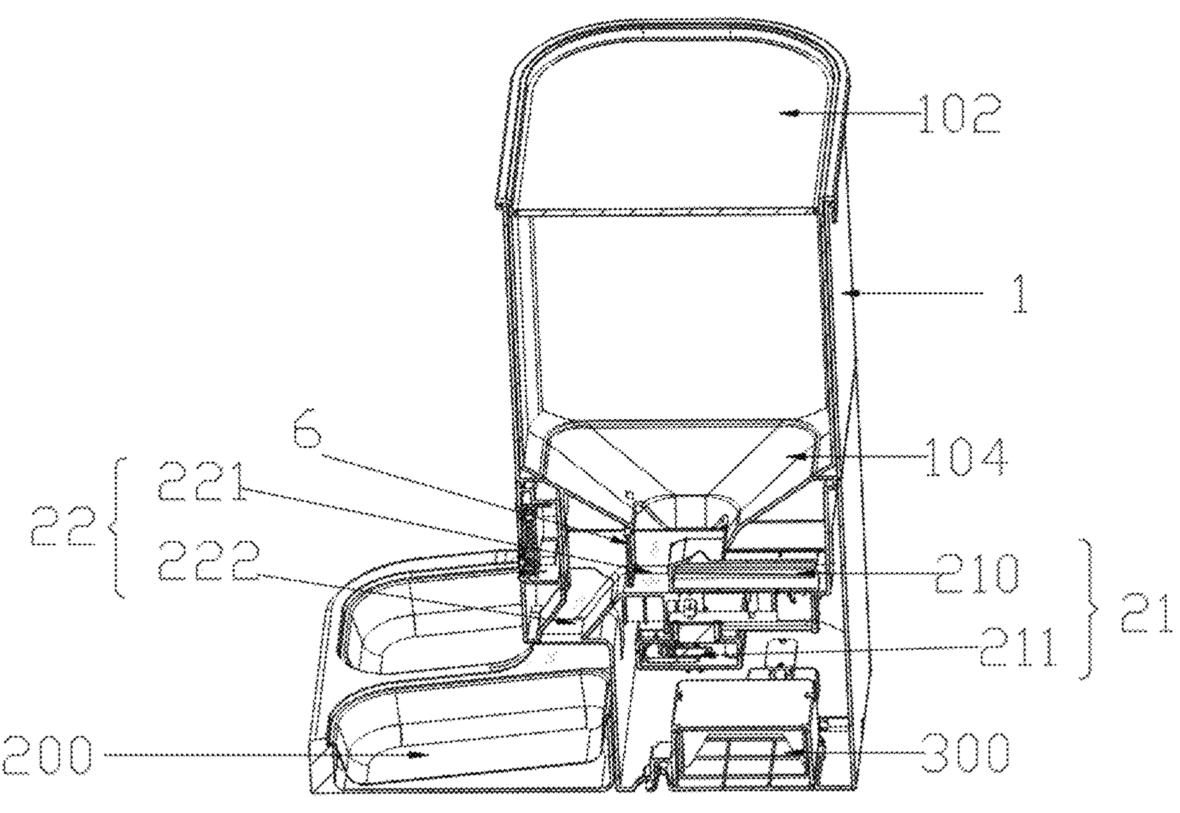
FIG. 3 is a sectional view of a pet feeder provided by the present application, and food conveying mechanisms in the figure are at an initial position.

As shown in FIG. 1 to FIG. 3, it is to be understood that a pet feeder provided by an embodiment includes: a food container assembly 1, feeding assemblies 2 and a base 3, in which, the food container assembly 1 and the feeding assemblies 2 are connected to the base 3; the food container assembly 1 is used for storing food, and the feeding assemblies 2 are used for conveying the food stored in the food container assembly 1 to a pet eating position; and the food container assembly 1 includes at least two food distribution bins 11 which are not in communication with each other, and the feeding assemblies 2 correspond to the food distribution bins 11 in quantity and are matched with the food distribution bins 11 one by one, so that any food distribution bin 11 can independently convey food by means of the corresponding feeding assembly 2.

It is to be understood that there is no limitation to the form or location of the pet eating position, and it is only indicated that the feeding assemblies 2 can convey the pet food stored in the food container assembly 1 to the outside of the food container assembly 1 so that a pet can eat the food. In one embodiment, the pet eating position can be a basin or a bowl which is additionally placed and is not connected to the pet feeder, or a basin-shaped appliance connected to the pet feeder provided by the present application.

In the pet feeder provided by the present application, by arranging the at least two food distribution bins 11 which are not in communication with each other, the effect of independently subpackaging and storing various foods is achieved; the problem that the pet feeder in the related technology is provided only one food bin, which leads to single food feeding, can be avoided; further, in the present application, by arranging the feeding assemblies 2 which are matched with the food distribution bins 11 one by one, each food distribution bin 11 can independently convey the food to the outside of the food distribution bin 11 by means of the corresponding feeding assembly 2, thereby avoiding the problem that various foods are conveyed by the same food channel 22, which leads to food pollution, and particularly avoiding the problem that when the pet feeder provided by the present application is used for feeding a plurality of different varieties of pets, the smell of foods of various pets may cause pet discomfort or picky eating.

That is, the pet feeder provided by the present application can not only meet the needs of feeding a plurality of pets at the same time, but also meet the needs of providing various foods for one pet in one meal; and moreover, the needs of feeding various pets that eat different foods by one pet feeder can also be met.

With reference to FIG. 3, further, any feeding assembly 2 includes a food conveying mechanism 21 and the food channel 22, in which, the food conveying mechanism 21 is movably arranged in the food channel 22; when closing a feeding mode of the pet feeder, the food conveying mechanism 21 is at an initial position, and the food channel 22 is connected to the corresponding food distribution bin 11; when starting the feeding mode of the pet feeder, the food conveying mechanism 21 moves and leaves the initial position to convey the food to the pet eating position from the food channel 22, after the feeding mode is finished, and the food conveying mechanism 21 returns to the initial position.

Further, any two food channels 22 are not in communication with each other.

With reference to FIG. 3, further, the food channels 22 include movable portions 221 through which the food conveying mechanisms 21 can move and feeding portion 222 connected to the ends, far away from the initial position, of the movable portions 221; the foods in the food distribution bins 11 enter the movable portions 221 under the movement of the food conveying mechanisms 21, and are conveyed to the pet eating position by means of the feeding portions 222 under the movement of the food conveying mechanisms 21.

With reference to FIG. 1 to FIG. 3, in one embodiment, the food container assembly 1 is arranged on the tops of the feeding assemblies 2, therefore, each food distribution bin 11 is positioned on the top of the corresponding food conveying mechanism 21, and an opening in the bottom of each food distribution bin 11 is matched with the top of the corresponding food conveying mechanism 21; and thus, when the food conveying mechanisms 21 move, the pet foods stored in the food distribution bins 11 will fall into the movable portions 221 of the food channels 22 from notches formed due to the movement of the food conveying mechanisms 21, and then are conveyed to the outside of the pet feeder by means of the feeding portions 222 for the pet to eat.

Further, in other embodiments, the food conveying mechanisms 21 can move horizontally or vertically; according to the position relationship between the food conveying mechanisms 21 and the food distribution bins 11, when the food conveying mechanisms 21 move to the initial position and the bottoms of the food distribution bins 11 are in communication with the food channels 22, the pet foods in the food distribution bins 11 can fall into the food channels 22, and when the food conveying mechanisms 21 move, the foods can be pushed to the pet eating position.

Figure 6:
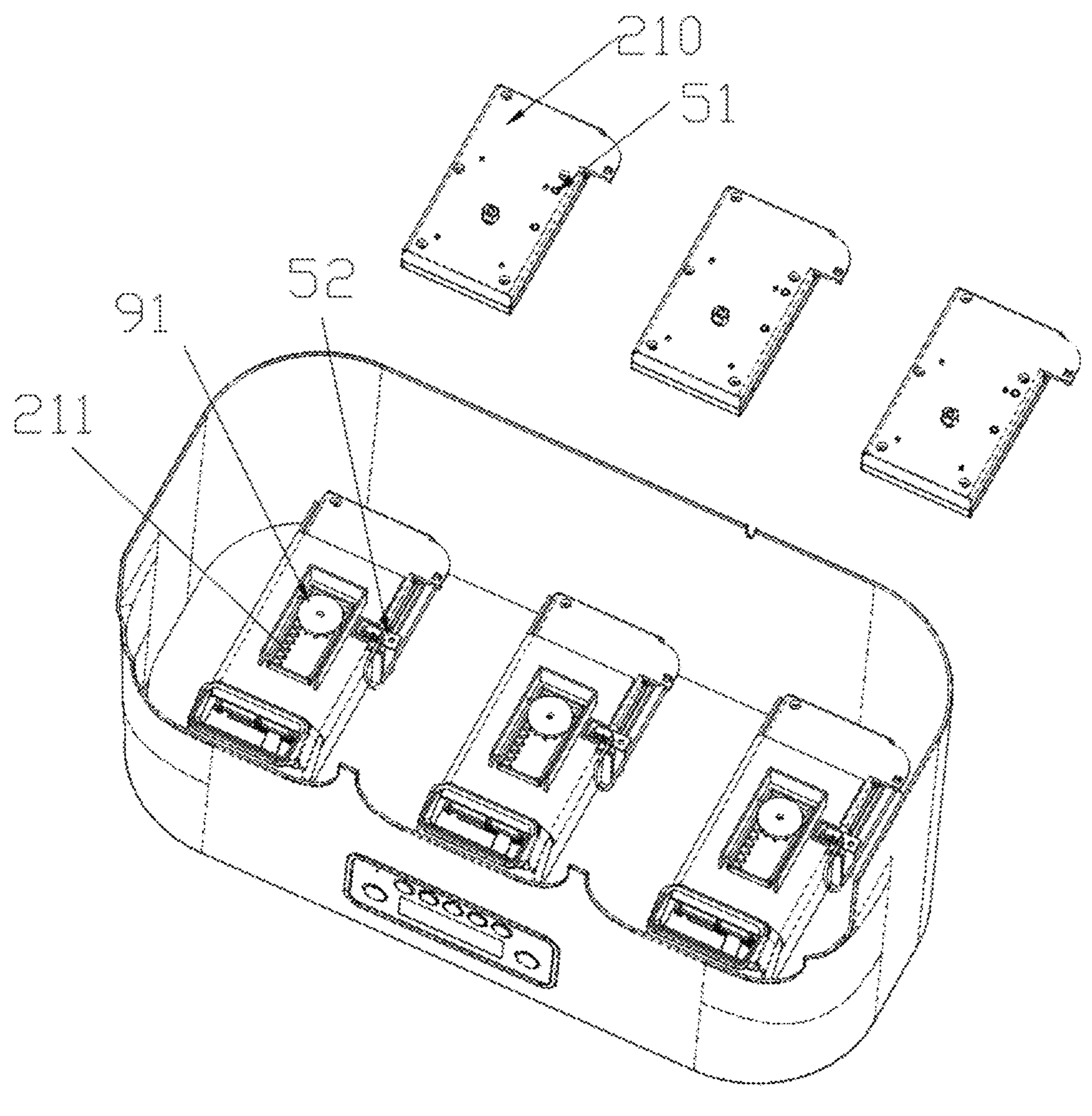
FIG. 6 is a schematic diagram of positions of sensing members and detection members in one embodiment.

With reference to FIG. 6, further, the pet feeder is further provided with a control assembly used for controlling the food conveying amount each time in the feeding mode, and the control assembly includes a plurality of sensing members 51 arranged on the food conveying mechanisms 21 and detection members 52 arranged in the food channels 22; the control assembly controls the food conveying amount by adjusting the moving positions of the food conveying mechanisms 21. According to the position relationship between the food conveying mechanisms 21 and the food channels 22 and the food distribution bins 11, the size of communication spaces between the food channels 22 and the food distribution bins 11 can be changed by controlling the moving distance of the food conveying mechanisms 21, thus the purpose of controlling the food falling amount of the food distribution bins 11 is achieved, and finally the effect of controlling the food conveying amount is achieved.

In one embodiment, the sensing members 51 can be magnetic members, and the detection members 52 can be Hall sensors; and the moving positions of the sensing members 51 on the food conveying mechanisms 21 can be sensed by means of the Hall sensors, so as to determine the target moving positions of the food conveying mechanisms 21. As described above, the food conveying mechanisms 21 serve as separating structures between the food distribution bins 11 and the food channels 22, so that the purpose of controlling the food conveying amount of the food distribution bins 11 can be achieved by controlling the moving distance and duration of the food conveying mechanisms 21. Specific selected elements of the sensing members 51 and the detection members 52 are only treated as examples, and in other embodiments, the sensing members 51 and the detection members 52 can also be elements with other corresponding functions.

With reference to FIG. 6, further, the plurality of sensing members 51 are linearly arranged on the tops of the food conveying mechanisms 21. The moving distance and the staying position of the food conveying mechanisms 21 in the linear direction can be marked by means of the sensing members 51 and the detection members 52.

With reference to FIG. 2 to FIG. 3, further, the pet feeder is further provided with food baffles 6 for controlling the food conveying amount each time in the feeding mode, and the food baffles 6 are movably arranged in the food channels 22. It is to be understood that structures for blocking the pet foods from moving are arranged in the food channels 22, which can also achieve the purpose of controlling the food conveying amount each time in the feeding mode.

With reference to FIG. 2 to FIG. 2, further, the food baffles 6 are rotationally connected to the food channels 22, and can open or close the food channels 22 when the food conveying mechanisms 21 move to a certain position. In one embodiment, the food conveying mechanisms 21 are configured to be capable of pushing the food baffles 6 to open, namely, when the food conveying mechanisms 21 are at the initial position, the foods in the food distribution bins 11 will fall into the movable portions 221 of the food channels 22 and are stacked between the food conveying mechanisms 21 and the food baffles 6; when the feeding mode is started, the food conveying mechanisms 21 will move towards the food baffles 6, and will push the pet foods that fill the movable portions 221 in the moving process, thus the pet foods can be moved to the food baffles 6; when the food conveying mechanisms 21 continuously move forwards, pressure will be applied to the food baffles 6 by the pet foods, thus the food baffles 6 are stressed to rotate and open, then the movable portions 221 are in communication with the feeding portions 222, and finally the pet foods in front of the food conveying mechanisms 21 enter the feeding positions 222 and are finally feed to the outside of the pet feeder. As shown in FIG. 3, the path pointed by the arrow in the figure is a food conveying path.

With reference to FIG. 2 to FIG. 3, further, the food baffles 6 are connected to the inner peripheral walls of the food channels 22 by torsional springs 7. The food baffles 6 are arranged to be matched with the inner peripheral walls of the food channels 22, and the food baffles 6 in an initial state without external force can close the food channels 22.

Further, the food conveying mechanisms 21 are arranged to reciprocate in the food channels 22.

Figure 4:
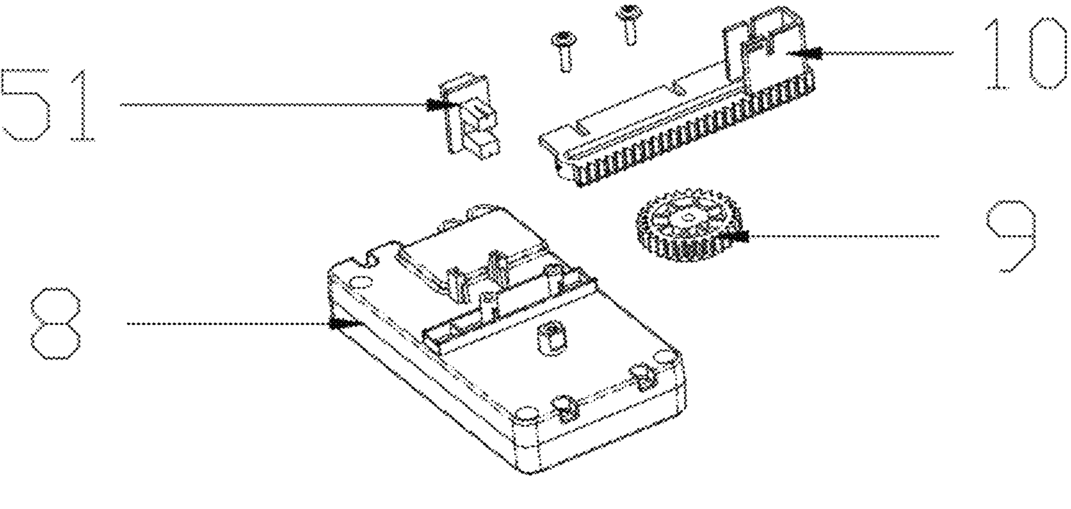
FIG. 4 is an exploded diagram of a driving assembly in one embodiment.

With reference to FIG. 3 and FIG. 4, further, the food conveying mechanisms 21 include food conveying push blocks 210 used for pushing food and driving assemblies 211 used for providing power for the food conveying push blocks 210; the driving assemblies 211 include reduction gear boxes 8, first driving gears 9 connected to the reduction gear boxes 8 in a meshed mode, and first racks 10 connected to the first driving gears 9 in a meshed mode; and the reciprocating directions of the food conveying mechanisms 21 are consistent with the length directions of the first racks 10.

Figure 5:
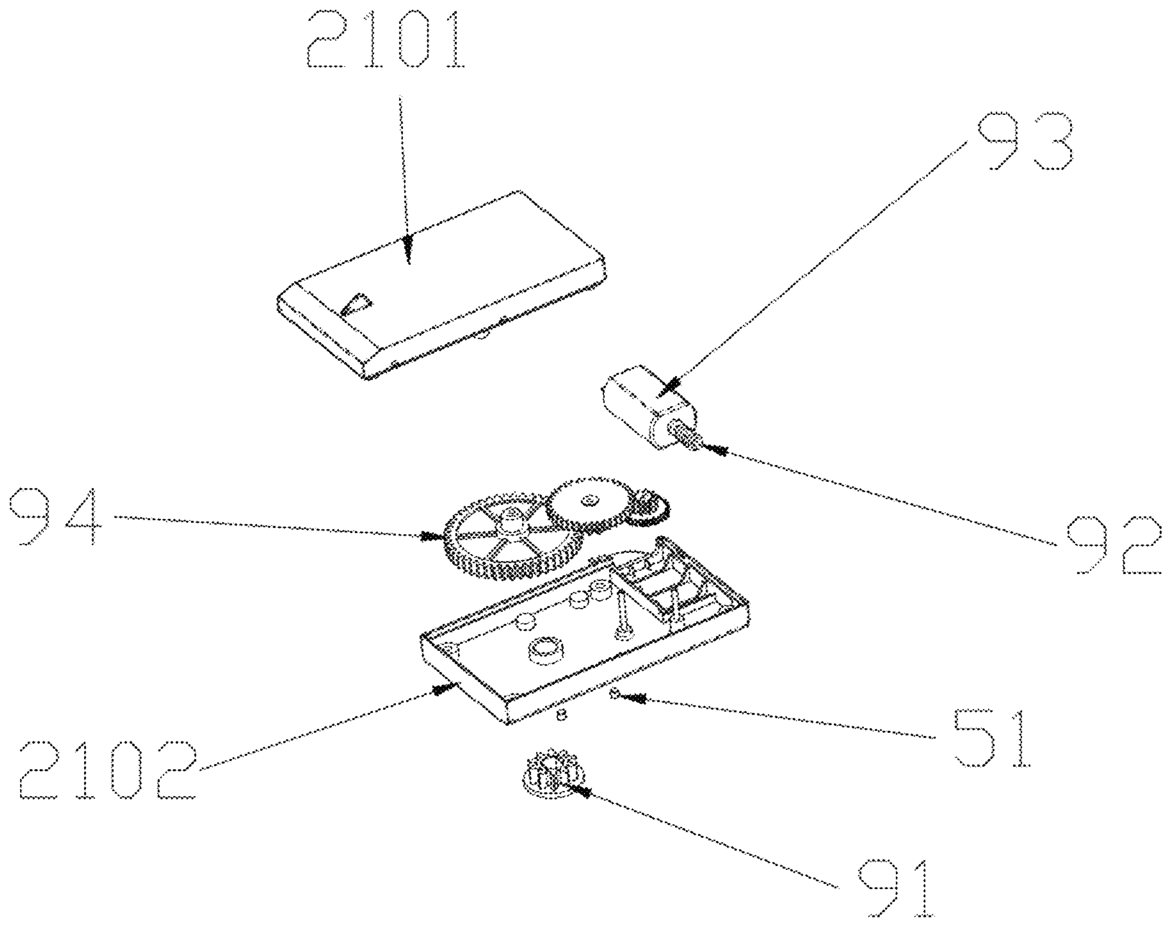
FIG. 5 is an exploded diagram of a driving assembly in another embodiment.

With reference to FIG. 3, FIG. 5 and FIG. 6, further, in another embodiment, the food conveying mechanisms 21 include the food conveying push blocks 210 used for pushing the foods, and second racks 211 arranged in the food channels 22; each food conveying push block 210 includes an upper cover 2101 and a lower cover 2102 which are fixedly connected and are sealed and fixed to form an accommodating space; and the food conveying push blocks 210 further include motors 93 and reduction gear sets 94 which are fixed in the accommodating space, in which, the motors 93 are provided with worms 92, and the reduction gear sets 94 are connected to the worms 92 in a meshed mode so that the motors 93 can drive the reduction gear sets 94 by means of the worms 92. The bottoms of the food conveying push blocks 210 are connected to second driving gears 91, and the second driving gears 91 are connected to the reduction gear sets 94 by linkage structures so that the second driving gears 91 and the reduction gear sets 94 can move synchronously. The second driving gears 91 are connected to the second racks 211 arranged in the food channels 22 in a meshed mode. When the food conveying mechanisms 21 run, the motors 93 drive the reduction gear sets 94 by means of the worms 92, thus the second driving gears 91 in linkage with the reduction gear sets 94 can be driven, and the second driving gears 91 move forwards or backwards in the food channels 22 along the second racks 211.

In another embodiment, the food conveying mechanisms 21 can be arranged as separating mechanisms between the food channels 22 and the food distribution bins 11, namely, when the feeding mode of the feeder is closed, the food conveying mechanisms 21 completely block the openings in the ends, close to the food channels 22, of the food distribution bins 11 and are propped against the food baffles 6; the food conveying mechanisms 21 serve as the separating structures between the food channels 22 and the food distribution bins 11, so that pet foods in the food distribution bins 11 are separated from the outside, and a better sealed storage effect is realized; when the feeding mode is started, as the food conveying mechanisms 21 move away from the food baffles 6, the food distribution bins 11 and the food channels 22 are in spatial communication, and thus the pet foods in the food distribution bins 11 can enter the food channels 22; then when the food conveying mechanisms 21 move towards the food baffles 6, the food conveying mechanisms 21 will push the foods in the food channels 22 to the direction of the food baffles 6; and after the food conveying mechanisms 21 return to the initial position, the food distribution bins 11 and the food channels 22 will be separated again.

By above arrangement, the food conveying mechanisms 21 in the present application have dual functions of conveying foods and sealing the food distribution bins 11, the space is better utilized, working steps of the pet feeder are reduced, and it is not needed to operate the sealing structures to open the food distribution bins 11 and control a food conveying device to convey foods during feeding by other food feeder; and compared with the technical solution that two structures are arranged for food conveying and sealing respectively, the pet feeder in the present application has more obvious advantages.

With reference to FIG. 1 to FIG. 3, further, the feeding assemblies 2 further include food basins 200 which are arranged at the tail ends, far away from the movable portions 221, of the feeding portions 222. In one embodiment, the feeding portions 222 are of an inclined structure along which the food discharged from the movable portions 221 can fall into the food basins 200.

With reference to FIG. 1 to FIG. 3, further, the at least two food distribution bins 11 which are not in communication with each other are linearly arranged. In one embodiment, a food container includes a food container body 101 connected to the base 3 and a food container cover 102 covering the top of the food container body 101; sliding cups 104 independent of one another and separating sleeves 103 fixedly connected to the sliding cups 104 are arranged in the food container body 101, and the number of intervals of the separating sleeves 103 is consistent with that of the sliding cups 104 so that the separating sleeves 103 and the sliding cups 104 can form the food distribution bins 11. Further, the food container assembly 1 includes at least three food distribution bins 11 which are not in communication with one another, and the at least three food distribution bins 11 which are not in communication with one another are annularly arranged.

Further, a control device and a battery 300 are arranged in the base 3, and the control device is electrically connected to the battery 300 and the feeding assembly 2.

Further, the control device includes a communication module which is in communication connection with a mobile terminal so that a user can control the pet feeder by means of the mobile terminal. By this arrangement, the user can feed different pets in different time periods, thereby avoiding the influence that the pets with large size are crowded or scramble for food.

Further, the control device further includes a control panel 400 arranged on the outer wall of the base 3. The control panel 400 can be used for directly controlling and adjusting the feeding mode of the pet feeder.

The above is a kind of pet feeder provided in the embodiment of the present application in detail, for those skilled in the art, according to the idea of the embodiment of the present application, there will be changes in the specific embodiment and the scope of application, in summary, the content of this description should not be understood as a restriction on the present application.

What is claimed is:

1. A pet feeder, comprising:

a food container assembly, feeding assemblies and a base, wherein the food container assembly and the feeding assemblies are connected to the base; the food container assembly is used for storing food, and the feeding assemblies are used for conveying the food stored in the food container assembly to a pet eating position;

wherein the food container assembly comprises at least two food distribution bins which are not in communication with each other, and the feeding assemblies correspond to the food distribution bins in quantity and are matched with the food distribution bins one by one, so that any food distribution bin independently conveys food by means of the corresponding feeding assembly;

wherein each feeding assembly comprises a food conveying mechanism, a food channel, and a food baffle, the food conveying mechanism is movably arranged in the food channel, the food baffle is movably arranged in and rotationally connected to the food channel;

wherein, when the food conveying mechanism moves toward the food baffle, the food conveying mechanism pushes pet food filled in the food channel, such that the pet food applies pressure to the food baffle, thereby causing the food baffle to rotate and open the food channel.

2. The pet feeder according to claim 1, wherein when closing a feeding mode of the pet feeder, the food conveying mechanism is at an initial position, and the food channel is in communication with the corresponding food distribution bin; when starting the feeding mode of the pet feeder, the food conveying mechanism moves and leaves the initial position to convey the food to the pet eating position from the food channel; after the feeding mode is ended, and the food conveying mechanism returns to the initial position.

3. The pet feeder according to claim 2, wherein any two food channels are not in communication with each other.

4. The pet feeder according to claim 2, wherein the food channels comprise movable portions through which the food conveying mechanisms are movable and feeding portions connected to an end of the movable portions opposite the initial position; the foods in the food distribution bins enter the movable portions under the movement of the food conveying mechanisms, and are conveyed to the pet eating position by means of the feeding portions under the movement of the food conveying mechanisms.

5. The pet feeder according to claim 4, wherein the feeding assemblies further comprise food basins which are arranged at tail ends of the feeding portions opposite the movable portions.

6. The pet feeder according to claim 2, further comprising: a control assembly used for controlling the food conveying amount each time in the feeding mode, wherein the control assembly comprises a plurality of sensing members arranged on the food conveying mechanisms and detection members arranged in the food channels; and the control assembly controls the food conveying amount by adjusting the moving positions of the food conveying mechanisms.

7. The pet feeder according to claim 6, wherein the plurality of sensing members are linearly arranged on the top of the food conveying mechanisms.

8. The pet feeder according to claim 2, wherein the food conveying mechanisms are arranged to reciprocate in the food channels.

9. The pet feeder according to claim 8, wherein the food conveying mechanisms comprise reduction gear boxes, driving gears connected to the reduction gear boxes in a meshed mode, and racks connected to the driving gears in a meshed mode; and the reciprocating direction of the food conveying mechanisms is consistent with the length direction of the racks.

10. The pet feeder according to claim 8, wherein the food conveying mechanisms comprise food conveying push blocks used for pushing food, and second racks arranged in the food channels;

the food conveying push blocks comprise motors and reduction gear sets; the motors are provided with worms, and the reduction gear sets are connected to the worms in a meshed mode so that the motors drive the reduction gear sets by means of the worms; the bottoms of the food conveying push blocks are connected to second driving gears, and the second driving gears are connected to the reduction gear sets by linkage structures so that the second driving gears and the reduction gear sets move synchronously;

the second driving gears are connected to the second racks arranged in the food channels in a meshed mode; and when the motors drive the second driving gears to move, the food conveying push blocks move forwards or backwards in the food channels along the second racks.

11. The pet feeder according to claim 1, wherein the food baffles are used for opening or closing the food channels when the food conveying mechanisms move to a certain position.

12. The pet feeder according to claim 1, wherein upper portions of the food baffles are connected to the inner peripheral walls of the food channels by torsional springs.

13. The pet feeder according to claim 1, wherein the food storage container assembly is arranged on top of the feeding assemblies.

14. The pet feeder according to claim 13, wherein at least two food distribution bins which are not in communication with each other are linearly arranged.

15. The pet feeder according to claim 13, wherein the food container assembly comprises at least three food distribution bins which are not in communication with one another, and the at least three food distribution bins which are not in communication with one another are annularly arranged.

16. The pet feeder according to claim 1, wherein a control device and a battery are arranged in the base, and the control device is electrically connected to the battery and the feeding assemblies.

17. The pet feeder according to claim 16, wherein the control device comprises a communication module which is in communication connection with a mobile terminal so that a user controls the pet feeder by means of the mobile terminal.

18. The pet feeder according to claim 16, wherein the control device further comprises a control panel arranged on the outer wall of the base.

* * * * *